US011728985B2

(12) United States Patent
Farrell et al.

(10) Patent No.: US 11,728,985 B2
(45) Date of Patent: Aug. 15, 2023

(54) FAULT TOLERANT PROVISIONING VERIFICATION FOR CRYPTOGRAPHIC KEYS

(71) Applicant: GM GLOBAL TECHNOLOGY OPERATIONS LLC, Detroit, MI (US)

(72) Inventors: Brian Farrell, Troy, MI (US); Thomas M. Forest, Macomb, MI (US); David W. Racklyeft, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 381 days.

(21) Appl. No.: 17/149,434

(22) Filed: Jan. 14, 2021

(65) Prior Publication Data

US 2022/0224531 A1 Jul. 14, 2022

(51) Int. Cl.
*H04L 29/06* (2006.01)
*H04L 9/14* (2006.01)
*H04L 9/08* (2006.01)
*H04L 9/32* (2006.01)
*H04L 9/00* (2022.01)

(52) U.S. Cl.
CPC ............... *H04L 9/14* (2013.01); *H04L 9/088* (2013.01); *H04L 9/0866* (2013.01); *H04L 9/3242* (2013.01); *H04L 9/50* (2022.05)

(58) Field of Classification Search
CPC ....... H04L 9/14; H04L 9/0866; H04L 9/0894; H04L 9/088; H04L 9/3242; H04L 9/3247; H04L 9/50; H04L 63/061; H04L 2209/84; H04L 9/08
See application file for complete search history.

(56) References Cited

U.S. PATENT DOCUMENTS

| 2015/0084753 A1* | 3/2015 | Biondo | ................. | B60R 25/246 |
| | | | | 340/426.11 |
| 2015/0270968 A1* | 9/2015 | Nairn | .................... | H04L 9/3242 |
| | | | | 713/181 |
| 2018/0019877 A1* | 1/2018 | Koo | ........................ | H04L 63/06 |

* cited by examiner

*Primary Examiner* — Yogesh Paliwal
(74) *Attorney, Agent, or Firm* — Lorenz & Kopf LLP

(57) ABSTRACT

The present application relates to a method and apparatus for providing fault tolerant provisioning verification for cryptographic keys including receiving, via an interface, a first security key, a second security key, and a first verification data generated in response to the first security key and the second security key, coupling, by a processor, the first security key and the second security key to an electronic controller, receiving, by the processor, a second verification data generated by the electronic controller in response to the first security key and the second security key, and marking, by the processor, the controller as provisioned in response to the first verification data matching the second verification data.

20 Claims, 5 Drawing Sheets

500

FAULT TOLERANT PROVISIONING VERIFICATION FOR CRYPTOGRAPHIC KEYS

BACKGROUND

The present disclosure relates generally to electronic computing systems. More specifically, aspects of this disclosure relate to systems, methods and devices to verify the loading, exporting, and storage of cryptographic keys into a secure peripheral by providing precomputed verification data with the cryptographic keys, storing the keys within the secure peripheral device, receiving verification data from the peripheral device and comparting the verification data to the precomputed verification data to confirm proper storage of the cryptographic keys.

Manufacturers of electronic components and electronic computing systems, such as processors, electronic control units (ECUs) and the like, often provide these systems to multiple competing parties. These systems often require secure data access to the device, secure communications between devices and the devices may contain proprietary algorithms, electronic data, and the like. Thus, these systems may require proprietary information for each of the competing parties to be installed on the system prior to delivery to each of the parties. This creates a problem in that different system must be created for each party so that proprietary information is not distributed and/or shared among the parties. Creating individual systems for each customer results in part proliferation which increases costs associated with the system and increases supply and distribution complexity. Complexity is increased as the supplier must maintaining secure access to the system for the customers and being able to verify that security credentials are properly stored on the system before product shipment and without back office intervention. It would be desirable to overcome these problems to provide a fault tolerant way for provisioning cryptographic keys in a secure electronic device.

The above information disclosed in this background section is only for enhancement of understanding of the background of the invention and therefore it may contain information that does not form the prior art that is already known in this country to a person of ordinary skill in the art.

SUMMARY

Disclosed herein are various secure electronic systems and related control logic for provisioning secure electronic systems, methods for making and methods for operating such systems, and motor vehicles equipped with onboard secure electronic systems. By way of example, and not limitation, there is presented a method and apparatus for verify the loading, exporting, and storage of secret keys that are loaded into security peripheral as plaintext, exported encrypted, and stored in non-volatile memory outside of the security peripheral for later use.

In accordance with an aspect of the present disclosure, a method including receiving, via an interface, a first security key, a second security key, and a first verification data generated in response to the first security key and the second security key, coupling, by a processor, the first security key and the second security key to an electronic controller, receiving, by the processor, a second verification data generated by the electronic controller in response to the first security key and the second security key, and marking, by the processor, the controller as provisioned in response to the first verification data matching the second verification data.

In accordance with another aspect of the present disclosure wherein the second security key is provisioned in the electronic controller using the first security key as an authorization key and wherein the second verification data is a message authentication code generated using the second security key.

In accordance with another aspect of the present disclosure further including recoupling, by the processor, the first security key and the second security key to the electronic controller in response to the first verification data not matching the second verification data.

In accordance with another aspect of the present disclosure wherein the first verification data is generated in response to a chaining of a message authentication code of the first security key and a message authentication code of the second authentication key.

In accordance with another aspect of the present disclosure wherein the first verification data is a message authentication code of the second security key.

In accordance with another aspect of the present disclosure further including storing, in a memory, the first security key, the second security key, the verification data, and a unique identifier associated with the electronic controller.

In accordance with another aspect of the present disclosure wherein the first security key and the second security key are coupled to the electronic controller in response to receiving a unique identifier from the electronic controller and wherein the first security key and the second security key are generated in response to the unique identifier.

In accordance with another aspect of the present disclosure further including marking, by the processor, the electronic controller as failed in response to the first verification data not matching the second verification data and a counter exceeding a provisioning attempt limit.

In accordance with another aspect of the present disclosure wherein the first security key and the second security key are generated in response to a unique identifier of the electronic controller.

In accordance with another aspect of the present disclosure, an apparatus including an interface for receiving a first security key, a second security key, and a first verification data generated in response to the first security key and the second security key, and a processor for coupling the first security key and the second security key to an electronic controller, for receiving a second verification data generated by the electronic controller in response to the first security key and the second security key, and for marking the electronic controller as provisioned in response to the first verification data matching the second verification data.

In accordance with another aspect of the present disclosure wherein the processor is further configured for recoupling the first security key and the second security key to the electronic controller in response to the first verification data not matching the second verification data.

In accordance with another aspect of the present disclosure wherein the first verification data is generated in response to a chaining of a message authentication code of the first security key and a message authentication code of the second authentication key.

In accordance with another aspect of the present disclosure wherein the first verification data is a message authentication code of the second security key.

In accordance with another aspect of the present disclosure including a memory for storing the first security key, the second security key, the verification data, and a unique identifier associated with the electronic controller.

In accordance with another aspect of the present disclosure wherein the processor is configured to couple the first security key and the second security key in response to receiving a unique identifier from the electronic controller and wherein the first security key and the second security key are generated in response to the unique identifier.

In accordance with another aspect of the present disclosure wherein the processor is configured to mark the electronic controller as failed in response to the first verification data not matching the second verification data and a counter exceeding a provisioning attempt limit.

In accordance with another aspect of the present disclosure wherein the second security key is provisioned in the electronic controller using the first security key as an authorization key and the second verification data is a message authentication code generated using the second security key.

In accordance with another aspect of the present disclosure wherein the first security key and the second security key are generated from a unique identifier of the electronic controller.

In accordance with another aspect of the present disclosure, an electronic controller provisioning device including a memory configured for storing a first secret key associated with a first customer, a second secret key associate with a second customer and a first verification data generated in response to the first secret key and the second secret key, and a processor configured to couple the first secret key and the second secret key to an electronic controller, for receiving a second verification data from the electronic controller, and for marking the electronic controller as provisioned in response to the first verification data matching the second verification data.

In accordance with another aspect of the present disclosure wherein the first secret key and the second secret key are generated from a unique identifier of the electronic controller and the first verification data and the second verification data are generated in to a chaining of a message authentication code of the first security key and a message authentication code of the second securitykey.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
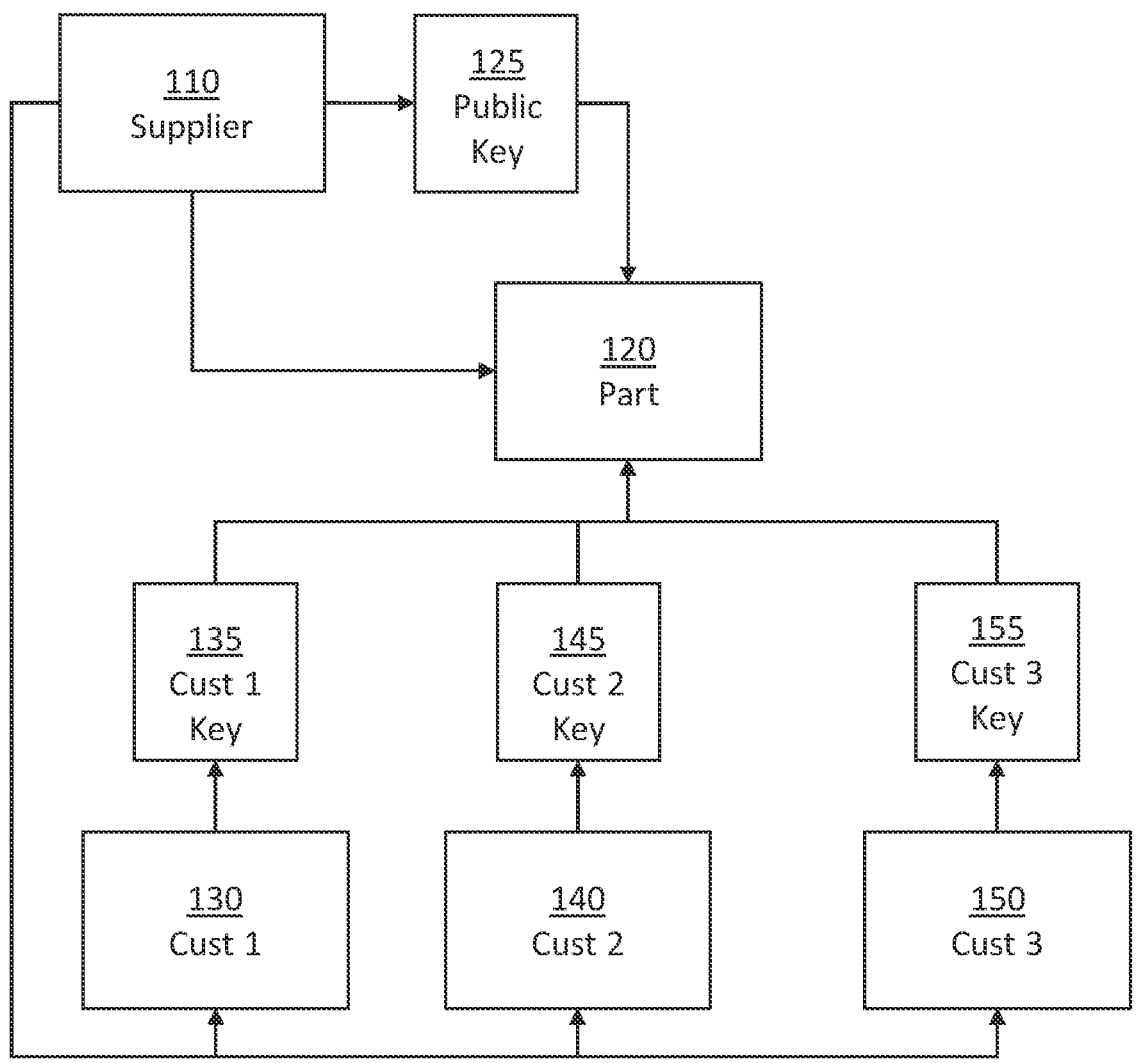
FIG. 1 shows an exemplary environment for providing fault tolerant provisioning verification for cryptographic keys according to an exemplary embodiment.

Turning now to FIG. 1, an exemplary environment 100 for providing fault tolerant provisioning verification for cryptographic keys according to an exemplary embodiment is shown. The exemplary environment 100 includes a supplier 110, a part 120, a first customer 130, a second customer 140 and a third customer 150. The environment 100 further includes a first customer key 135, a second customer key 145, a third customer key 155 and a public key 125. The disclosed system and method are configured to facilitate a part to be supplied by a trusted supplier 110 to mutually distrusting customers 130, 140, 150 that need to be able to provision security credentials for use in their ecosystem in such a way that doesn't allow the other parties to know or inappropriately use their security credentials, even if observing the provisioning. In addition, the disclosed system must provide a fault tolerant method for verifying the loading, exporting, and storage of the customer keys 135, 145, 155, and public key 125 that are loaded into the part 120.

In this exemplary embodiment, a trusted supplier 110 may supply the part 120 with a default public key 125 and a unique secret key 135, 145, 155, generated for each customer 130, 140, 150, receiving the part 120. The part 120 is configured to reject software updates that could result in the part 120 being modified by a party to behave maliciously in another party's ecosystem until the part 120 has been configured for use in a particular party's ecosystem which results in erasing the secret key and any associated data of all other parties. The unique secret key ensures that each party is able to keep their security credentials confident even if another party observes the provisioning of those security credentials.

To achieve the providing of an individually secure system to multiple parties, the supplier 110 first provides parts 120 to each of the first customer 130, second customer 140 and third customer 150, wherein each part 120 has a unique ID (UID). Each of the customers has a customer key 135, 145, 155 which is secret to only that customer. A secret key is generated for each customer using the UID and the customer keys 135, 145, 155. Each party's secret key is derived from the UID using the customer keys 135, 145, 155 which ensures that each customer only knows its own secret key and does not know the secret keys of the other customers 130, 140, 150. Alternatively, each key 135, 145, 155 may be a key provisioning key (KPKey) wherein the supplier provides a KP Key for each customer/region in the part. The KP Keys may be derived from the UID and an algorithm that only that customer/region and the supplier know. In this example, the KP Keys end up in the parts, but not the algorithm to generate the KP Keys.

Each of the customers 130, 140, 150 receiving the parts 120 is able to configure the part 120 for use in their ecosystem by using the UID and their customer key 135, 145, 155, to generate the appropriate secret key in the part and provision the part with their security credentials. Another customer 130, 140, 150, receiving the part is unable to configure the part for use in another parties' ecosystem without the appropriate customer key 135, 145, 155. In addition, other customers receiving the parts 120 also are not able to determine the security credentials of other parties if they observe the part being configured, as the security credentials are encrypted with the party's customer key 135, 145, 155 that is not known by the other parties. Once the part 120 is accessed with a particular customer key 135, 145, 155, information related to other customers is then erased to prevent a party from using another party's security credentials after taking control of the part. This is achieved by not allowing a software update until all other customer keys 135, 145, 155 are erased.

Each part 120 is further supplied with a public key 125 for each party receiving the part 120. Since, the part 120 will not allow software updates to occur until the part 120 has been configured for use by a particular customer, the default root public keys 125 are used to transition to the customer's production root public key, but are not permitted to be used for software updates. When the production root public key is provisioned, it erases all of the other parties' secret keys prior to allowing the production root public key to be used to change the software. This prevents any party from being able to modify the software of the part and use the secret key of another customer to determine security credentials used in that customer's ecosystem or be able to put malware on a part 120 that has valid security credentials for another customer's ecosystem.

While configuring the part 120 with the plurality of keys, the supplier 110 must verify provisioning of the keys within the part 120. It is desirable to be able to securely store keys outside of a security peripheral while verifying that the keys were properly loaded, protected, and stored. This may include verifying that keys provisioned to a part 120 are properly provisioned using a single piece of pre-computed verification data such that verification through back office communication is not required.

In one exemplary embodiment, the system may use the chaining of Message Authentication Codes (MACs) created with the keys 125, 135, 145, 155, being provisioned to an part 120 to provide a single piece of verification data that proves that all keys 125, 135, 145, 155, were loaded, exported, and successfully stored securely in the part 120. The system may use pre-computed verification data that is provided with the provisioning record such that interaction with the back office is not required. For example, a single piece of data may be pre-computed by the supplier 110 such that it may be used to verify that all keys 125, 135, 145, 155, were properly loaded into the part 120, exported from the part 120, and stored in memory outside of the security peripheral. This may allow keys 125, 135, 145, 155 to be securely stored outside of the security peripheral, where much more memory is available, in such a way that ensures they were properly stored. Furthermore, this may prevent a malicious party who intercepts the key provisioning packages from being able to change them in such a way that convinces a verification tool that the keys 125, 135, 145, 155 were provisioned correctly since they will not know the keys 125, 135, 145, 155 to be able to generate verification data that will match what is returned by the part 120. This provides a way to supply pre-computed verification data in such a way that does not provide an adversary any information about the keys 125, 135, 145, 155 being provisioned and verified.

In addition, the system requires a fault-tolerant method to verify correct provisioning of a part 120 with the keys 125, 135, 145, 155. If there is a failure during key provisioning before the verification data is returned from the part 120 then the provisioning data cannot be tried again if the key was already written due to an anti-replay counter. Therefore, the verification data from the part 120 cannot be obtained and it is not known if the key was written properly. In this instance, verification that the key was successfully provisioned involves back office interaction. To overcome these difficulties, the exemplary system 100 allows for the same provisioning record to be provided to the same part 120 multiple times and get confirmation that the keys 125, 135, 145, 155, provided via the record were successfully stored even if there was a failure that occurred at any time prior to getting the confirmation during any previous provisioning attempt. Successfully reaching provisioning process step n+1 assures that steps 1 through n were completed successfully.

In an exemplary embodiment, a data record for provisioning the Master Key of a SHE-compliant security peripheral and one additional key, such as an unlock key, may be created in such a way that allows for verification that the proper keys 125, 135, 145, 155, are stored in the part 120 even if the provisioning verification data from the part 120 is not available because one or more of the keys 125, 135, 145, 155, were already provisioned. This may be accomplished by first attempting to provision a first key, such as a master key, in the record to the part 120 of using a current key as an authorization key. The next key, such as an unlock key, may then be provisioned using the first key as the authorization key. The exemplary system may then generate a MAC using this key, and compare it to a MAC in the data record. In this example, even if the results of provisioning with the first two keys is unknown, using the last key in the chain to generate a MAC as proof that the last key is provisioned properly proves that the provisioning was successful because proper provisioning of the last key could only happen if the second from last key is provisioned properly, thus the MAC also proves the second from last key. This repeats to the head of the chain if more than 2 keys are provisioned.

Figure 2:
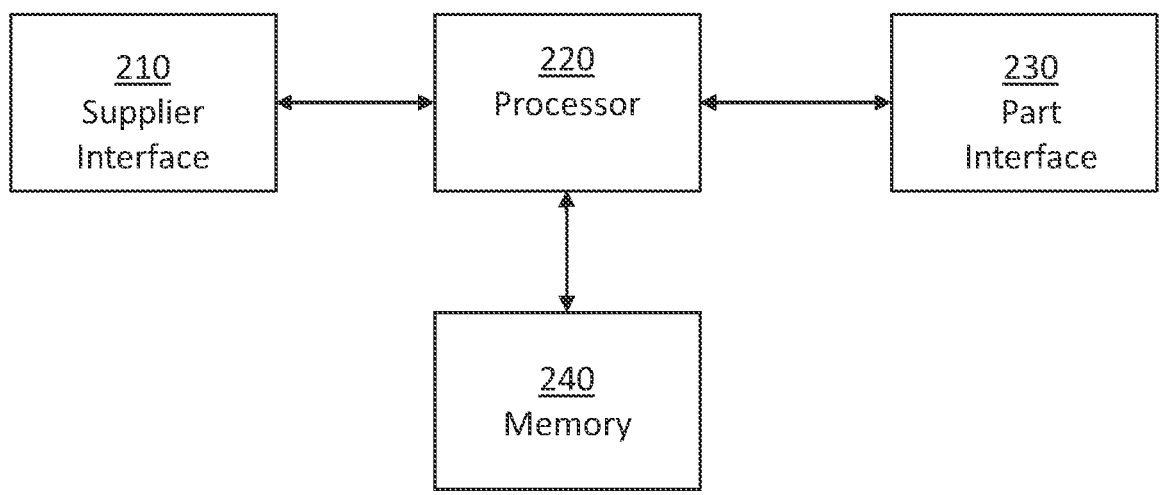
FIG. 2 shows a block diagram of a system for providing fault tolerant provisioning verification for cryptographic keys according to another exemplary embodiment.

Turning now to FIG. 2, a system 200 for providing fault tolerant provisioning verification for cryptographic keys according to an exemplary embodiment is shown. The exemplary system 200 may be a part provisioning system and may include a processor 220, a memory 240 and a supplier interface 210 and a part interface 230. In this exemplary embodiment the system may be used for provisioning electronic parts or components, such as ECUs, vehicle controllers, or the like and for storing security keys for various parties within the electronic part.

The supplier interface 210 is configured to receive security data related to a particular electronic part from a part supplier. In an exemplary embodiment, the data may include a part UID, a first secret key associated with a first customer, a second secret key associated with a second customer, a public key and a verification data. In this example, the first security key and the second security key are generated by the supplier from the UID of the device such that the keys are unique for each device. The processor 220 is configured to receive this data from the supplier interface 210 and to store the data on the memory 240. While this example is described with a first customer key and a second customer key, any number of customer keys may be provisioned on the part by the exemplary provisioning system.

The part interface 230 is configured to electronically couple data to a part for provisioning of the part. The part interface 230 may be a CAN bus interface, a USB interface, a wireless transmission interface or any other interface capable of transmitting and receiving electronic data. In one exemplary embodiment, a part is first coupled to the part interface 230. The part interface 230 is then configured to receive a UID from the part. The part interface 230 couples the received UID to the processor 220. The UID may alternatively be manually entered by a user, via a user interface, or the like.

The processor 220 is then configured to receive the UID and to retrieve the data corresponding to the UID from the memory 240. The processor 220 then couples the first customer key, the second customer key to the part interface 230 for coupling to the part. In response to receiving the first customer key, the second customer key from the part interface 230, the part is configured to store the keys and to generate a part verification data in response to the keys. The part then couples the verification data back to the part interface 230. The processor 220 then receives the verification data from the part, compares this verification data to the verification data stored in the memory. If the verification data matches, the part has been correctly provisioned with the keys and that the keys have been correctly stored in both the memory 240 and the part.

In one exemplary embodiment, the verification data may be generated using Chaining of Message Authentication Codes (MACs) created with the keys being verified to provide a single piece of verification data, such that the result of the MAC is the verification data. Advantageously, this allows for the part to store the various keys, generating the MAC after each successful storage of each successive key in the chain. The processor 220 may then verify from any received verification data that all previously stored keys were stored correctly. If any received verification does not match that in the memory, the processor 220 may determine that at least one prior key or the current key was incorrectly stored and that the part must be re-provisioned. The system may employ an anti-replay counter to limit the number of times a part provisioning may be attempted in order to prevent provisioning data to be used again. This prevents keys that are no longer valid from being put back into the part.

Current methods and system for provisioning security keys to parts, such as security peripherals, may not allow proper provisioning of the security key to be confirmed if there is a failure at some point after the keys are written to the part but prior to receiving the verification data from the part. As a result, the part may need to be scrapped if there is a failure during the process. Alternatively, verification of the provisioning today requires interaction with the back office component that generated the provisioning record for the security peripheral. To overcome these problems, the current system allows for the same provisioning record to be provided to the same ECU multiple times and get confirmation that the keys provided via the record were successfully stored in the part even if there was a failure that occurred at any time prior to getting the confirmation during any previous provisioning attempt. The system 200 may further incorporate self-validation in each step of the provisioning process, eliminating the need to interact with the back office system that created the provisioning record for the security peripheral in order to verify that the keys were successfully provisioned.

Figure 3:
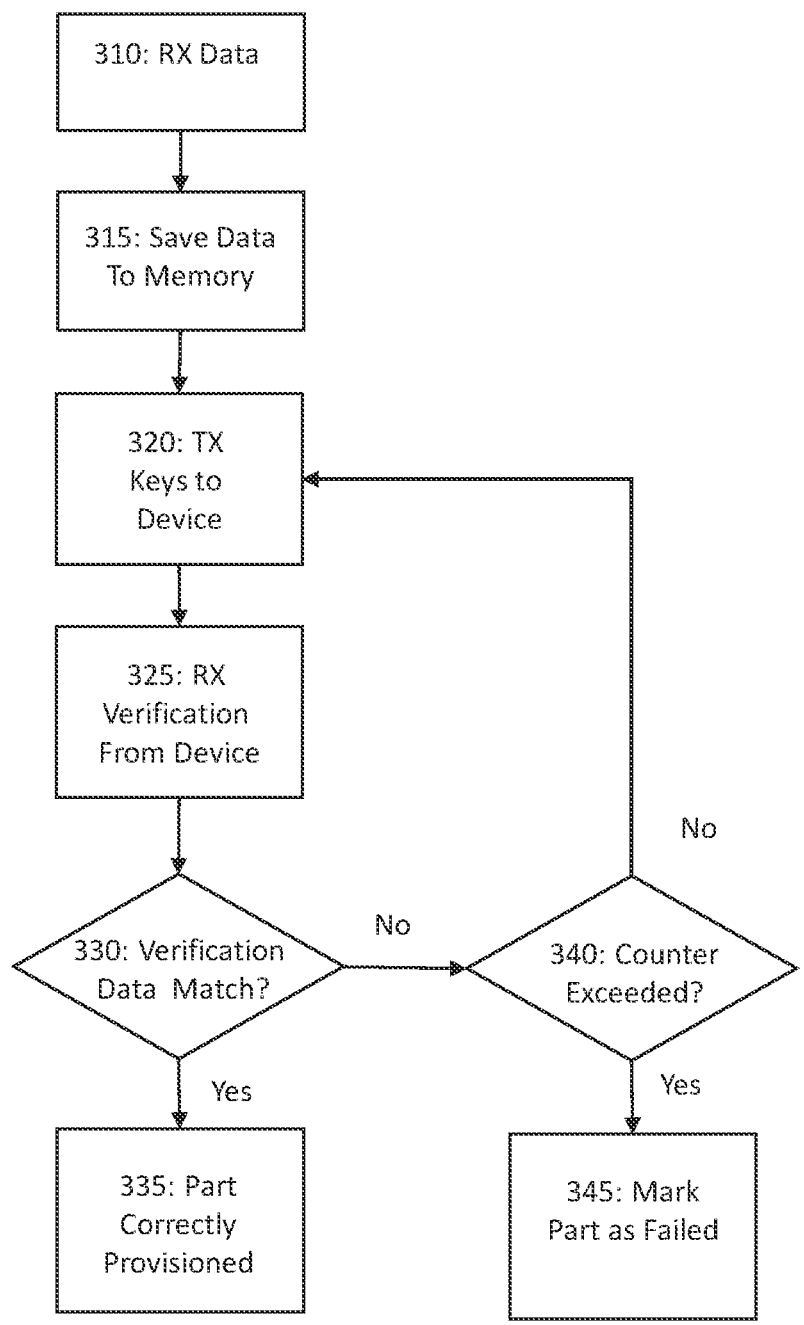
FIG. 3 shows a flow chart illustrating a method for providing fault tolerant provisioning verification for cryptographic keys according to an exemplary embodiment.

Turning now to FIG. 3, a flow chart illustrating a method 300 for providing fault tolerant provisioning verification for cryptographic keys according to an exemplary embodiment is shown. The exemplary method is configured to receive 310, via an electronic interface, security data including a first customer key, a second customer key, and a verification data. In one exemplary embodiment, the verification data may be generated in response to a chaining of MACs created with the keys. The method then store 315 the data to a memory or the like.

The method is next operative to couple 320 the first customer key, the second customer key to an electronic device, such as an ECU or the like, for provisioning of the electronic device. The keys may be coupled to the device via a provisioning interface or the like. A programming tool performing the method may further trigger the device to create the verification data in response to the keys. The verification data is created in an identical manner to the creation of the verification data with the security data, such as using the chaining of MACS created from the keys.

In response to the provisioning of the keys to the electronic device, the method is next operative to receive 325 a verification data from the electronic device. The verification data received from the electronic device is then compared to the verification data stored in the memory to determine if 330 there is a match of the verification data. A match of the verification data is indicative of a correct provisioning of the electronic device with the first customer key, the second customer key.

If there is a match between the verification data, the part is determined 335 to be correctly provisioned and the provisioning process for that part is complete. If the verification does not match, the method then determines if 340 a provisioning attempt counter has been exceeded. This counter limits the number of attempts that the provisioning process may be attempted on a part. If the counter is exceeded, the part is marked 345 as failed and the provisioning process is halted. If the counter is not exceeded, the counter is incremented, and the process returns to transferring 320 the keys to the electronic device.

Figure 4:
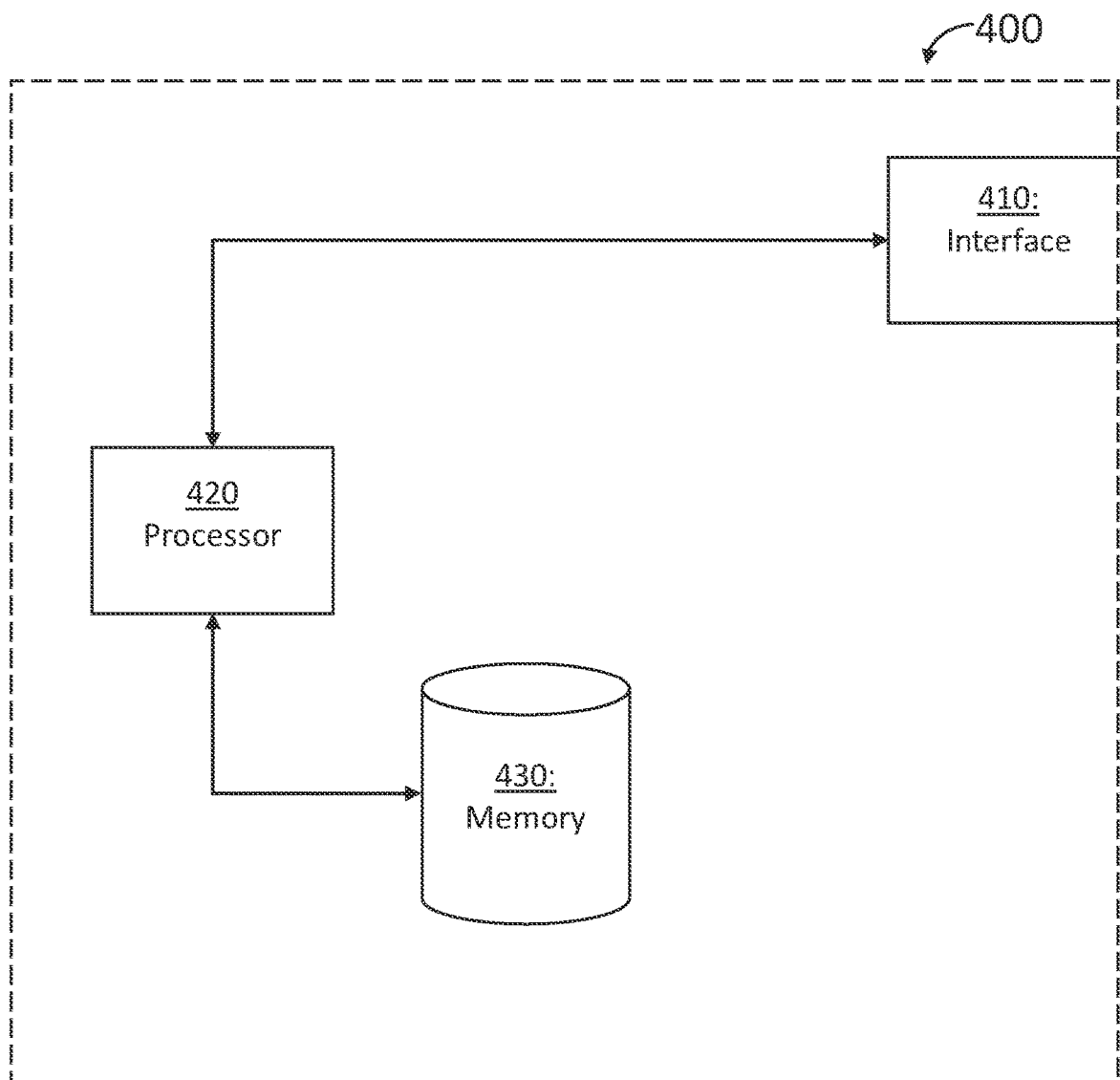
FIG. 4 shows a block diagram illustrating another system for providing fault tolerant provisioning verification for cryptographic keys according to another exemplary embodiment.

Turning now to FIG. 4, a diagram illustrating an exemplary embodiment of a system 400 for providing fault tolerant provisioning verification for cryptographic keys is shown. The exemplary system 400 may include a memory 410, a processor 420, and an interface 430.

The interface 430 may be configured for receiving a first security key, a second security key, and a first verification data generated in response to the first security key and the second security key. In addition, the interface 430 may be enabled for electronic communications between the system 400 and an electronic controller to enable cryptographic provisioning of the electronic controller. The interface may be a CAN bus interface, a USB interface, an ethernet port, or a wireless interface, such as a Wi-Fi interface, Bluetooth interface or other wireless transmission interface.

The processor 420 may be configured for coupling the first security key and the second security key to an electronic controller, for receiving a second verification data generated by the electronic controller in response to the first security key and the second security key, and for marking the electronic controller as provisioned in response to the first verification data matching the second verification data. The first security key, the second security key and the second verification data may be coupled between the electronic controller and the processor 420 via the interface 430. the processor is further configured for recoupling the first security key and the second security key to the electronic controller in response to the first verification data not matching the second verification data. The processor 420 may be configured to couple the first security key and the second security key in response to receiving a unique identifier from the electronic controller and wherein the first security key and the second security key are generated from the unique identifier. In addition, the processor 420 may be configured to mark the electronic controller as failed in response to the first verification data not matching the second verification data and a counter exceeding a provisioning attempt limit.

A memory 410 is further provided for storing the first security key, the second security key, the verification data, and a unique identifier associated with the electronic controller. The first verification data may be a message authentication code of the second security key. For example, the first verification data and the second verification data may be generated in response to a chaining of a message authentication code of the first security key and a message authentication code of the second authentication key.

The first security key and the second security key may be unique to an individual electronic controller such that one security key may not provide access to more than one electronic controller. For example, the first security key and the second security key may be generated in response to a unique identifier of the electronic controller. In addition, during provisioning of the electronic controller, the second security key may be provisioned in the electronic controller using the first security key as an authorization key and the second verification data is a message authentication code generated using the second security key. Thus, a proper indication of the correct provisioning of the second security key is indicative of a correct provisioning of the first security key.

In an exemplary embodiment, the system 400 may be an electronic controller provisioning device including a memory 410 configured for storing a first secret key associated with a first customer, a second secret key associate with a second customer and a first verification data generated in response to the first secret key and the second secret key. In addition, the system may include a processor 420 configured to couple the first secret key and the second secret key to an electronic controller, for receiving a second verification data from the electronic controller, and for marking the electronic controller as provisioned in response to the first verification data matching the second verification data. In this embodiment, the first secret key and the second secret key may be generated in response to a unique identifier of the electronic controller and the first verification data and the second verification data are generated in to a chaining of a message authentication code of the first security key and a message authentication code of the second authentication key.

Figure 5:
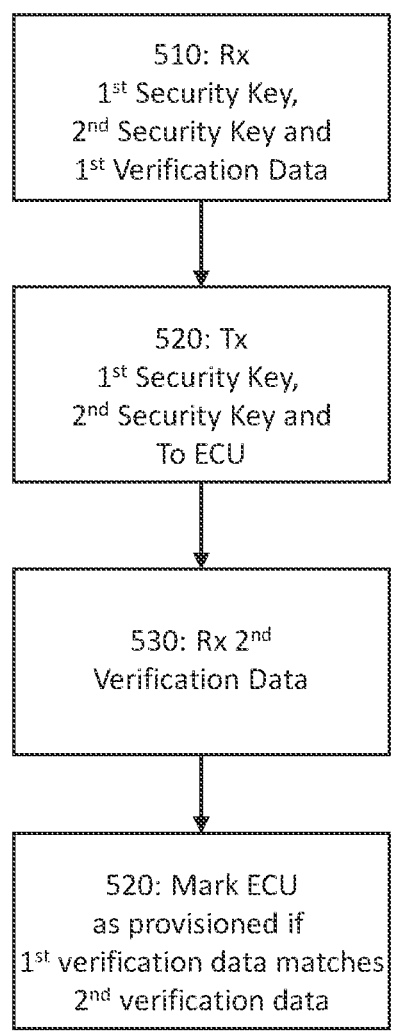
FIG. 5 shows a flow chart illustrating another method for providing fault tolerant provisioning verification for cryptographic keys according to another exemplary embodiment.

Turning now to FIG. 5, a flow chart illustrating an exemplary implementation of a method 500 for providing fault tolerant provisioning verification for cryptographic keys is shown. The method is first operative for receiving 510, by an interface, a first security key, a second security key, and a first verification data generated in response to the first security key and the second security key. In one exemplary embodiment, the first security key and the second security key may be unique to an individual electronic controller. For example, the first security key and the second security key may be generated in response to a unique identifier of the electronic controller The first verification data may be generated in response to a chaining of a message authentication code of the first security key and a message authentication code of the second authentication key. For example, the first verification data may be a message authentication code of the second security key.

The first security key and the second security key are next coupled 520, by a processor, to an electronic controller. In one exemplary embodiment, the second security key may be provisioned in the electronic controller using the first security key as an authorization key and wherein the second verification data is a message authentication code generated using the second security key. The processor may be further configured for storing, in a memory, the first security key, the second security key, the verification data, and a unique identifier associated with the electronic controller. In one exemplary embodiment, the first security key and the second security key may be coupled to the electronic controller in response to receiving a unique identifier from the electronic controller and wherein the first security key and the second security key are generated in response to the unique identifier.

The processor may next receive 530, a second verification data generated by the electronic controller in response to the first security key and the second security key. The second verification data may be generated in the same manner that the first verification data was generated by an electronic controller supplier or the like. The processor may then compare the second verification data to the first verification data stored in a memory The processor may next mark 540 the controller as provisioned in response to the first verification data matching the second verification data. Alternatively, the processor may recouple the first security key and the second security key to the electronic controller in response to the first verification data not matching the second verification data and a counter being less than a threshold value. If the counter threshold value is exceeded, indicating that a maximum number of recoupling attempts have been attempted, the processor may then mark the electronic controller as failed and/or reject the electronic controller.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A method comprising:
receiving, via an interface, a first security key, a second security key, and a first verification data generated to using the first security key and the second security key;

transmitting, by a processor, the first security key and the second security key to an electronic controller;

receiving, by the processor, a second verification data generated by the electronic controller to using the first security key and the second security key; and marking, by the processor, the electronic controller as provisioned in response to the first verification data matching the second verification data.

2. The method of claim 1, wherein the second security key is provisioned in the electronic controller using the first security key as an authorization key and wherein the second verification data is a message authentication code generated using the second security key.

3. The method of claim 1, further including retransmitting, by the processor, the first security key and the second security key to the electronic controller in response to the first verification data not matching the second verification data.

4. The method of claim 1, wherein the first verification data is generated in response to a chaining of a message authentication code of the first security key and a message authentication code of the second security key.

5. The method of claim 1, wherein the first verification data is a message authentication code of the second security key.

6. The method of claim 1, further including storing, in a memory, the first security key, the second security key, the first verification data, and a unique identifier associated with the electronic controller.

7. The method of claim 1, wherein the first security key and the second security key are coupled to the electronic controller in response to receiving a unique identifier and wherein the first security key and the second security key are generated from the unique identifier.

8. The method of claim 1, further including marking, by the processor, the electronic controller as failed in response to the first verification data not matching the second verification data and a counter exceeding a provisioning attempt limit.

9. The method of claim 1, wherein the first security key and the second security key are generated in response to a unique identifier of the electronic controller.

10. An apparatus comprising:
an interface for receiving a first security key, a second security key, and a first verification data generated using the first security key and the second security key;
a microprocessor for transmitting the first security key and the second security key to an electronic controller, for receiving a second verification data generated by the electronic controller using the first security key and the second security key, and for marking the electronic controller as provisioned in response to the first verification data matching the second verification data; and
a memory for storing the first security key, the second security key, and the verification data.

11. The apparatus of claim 10, wherein the wherein the microprocessor is further configured for retransmitting the first security key and the second security key to the electronic controller in response to the first verification data not matching the second verification data.

12. The apparatus of claim 10, wherein the first verification data is generated in response to a chaining of a message authentication code of the first security key and a message authentication code of the second security key.

13. The apparatus of claim 10, wherein the first verification data is a message authentication code of the second security key.

14. The apparatus of claim 10, wherein the memory is further configured for storing a unique identifier associated with the electronic controller.

15. The apparatus of claim 10, wherein the microprocessor is configured to couple the first security key and the second security key in response to receiving a unique identifier from the electronic controller and wherein the first security key and the second security key are generated in response to the unique identifier.

16. The apparatus of claim 10, wherein the microprocessor is configured to mark the electronic controller as failed in response to the first verification data not matching the second verification data and a counter exceeding a provisioning attempt limit.

17. The apparatus of claim 10, wherein the second security key is provisioned in the electronic controller using the first security key as an authorization key and the second verification data is a message authentication code generated using the second security key.

18. The apparatus of claim 10, wherein the first security key and the second security key are generated from a unique identifier of the electronic controller.

19. An electronic controller provisioning device comprising:
a memory configured for storing a first secret key associated with a first customer, a second secret key associated with a second customer and a first verification data generated using the first secret key and the second secret key; and
a processor configured to transmit the first secret key and the second secret key to an electronic controller, for receiving a second verification data from the electronic controller generated using the first secret key and the second secret key, and for marking the electronic controller as provisioned in response to the first verification data matching the second verification data.

20. The electronic controller provisioning device of claim 19, wherein the first secret key and the second secret key are generated in response to a unique identifier of the electronic controller and the first verification data and the second verification data are generated by a chaining of a message authentication code of the first secret key and a message authentication code of the second secret key.

* * * * *